United States Patent [19]

Auxier et al.

[11] Patent Number: 4,887,663
[45] Date of Patent: Dec. 19, 1989

[54] HOT GAS DUCT LINER

[75] Inventors: Thomas A. Auxier, Palm Beach Gardens; James B. Rannie; Robert E. Field, both of Tequesta, all of Fla.

[73] Assignee: United Technologies Corporation, Hartford, Conn.

[21] Appl. No.: 200,489

[22] Filed: May 31, 1988

[51] Int. Cl.⁴ .......................... F24H 3/00; F23R 3/08
[52] U.S. Cl. .................................... 165/47; 60/757; 60/39.32
[58] Field of Search ................ 165/47, 169; 60/39.32, 60/757, 755, 752, 759

[56] References Cited

U.S. PATENT DOCUMENTS

| | | | |
|---|---|---|---|
| 2,884,759 | 5/1959 | Sevcik | 60/757 |
| 3,064,425 | 11/1962 | Hayes | 60/757 |
| 3,307,354 | 3/1967 | Macaulay et al. | 60/757 |
| 3,793,827 | 2/1974 | Ekstedt | 60/757 |
| 4,050,241 | 9/1977 | Du Bell | 60/757 |
| 4,077,205 | 3/1978 | Pane et al. | 60/39.32 |
| 4,104,874 | 8/1978 | Caruel et al. | 60/757 |
| 4,109,459 | 8/1978 | Ekstedt et al. | 60/757 |
| 4,184,326 | 1/1980 | Pane, Jr. et al. | 60/39.32 |
| 4,292,810 | 10/1981 | Glenn | 60/757 |
| 4,302,941 | 12/1981 | Du Bell | 60/757 |
| 4,446,693 | 5/1984 | Pidcock et al. | 60/39.32 |
| 4,800,718 | 1/1989 | Zimmerman | 60/757 |

Primary Examiner—Louis J. Casaregola
Assistant Examiner—Timothy S. Thorpe
Attorney, Agent, or Firm—Edward L. Kochey, Jr.

[57] ABSTRACT

Overlapping liner plates 12, 14, 16 are secured at the upstream end to support surface 22. Cooling air 26 supplied through compartmental plenums 24 passes between (54) the plates and over (56) the plate surface. Complementary elongated depressions 40, 46 selectively guide the airflow and provide flexibility to absorb transverse expansions.

8 Claims, 4 Drawing Sheets

HOT GAS DUCT LINER

This Government has rights in this invention pursuant to a contract awarded by the Department of the Air Force.

1. Technical Field

The invention relates to liners for ducts which are conveying hot gas and in particular to air cooled lightweight liners.

2. Background of the Invention

In gas turbine engines there is often a requirement to convey hot gases at a temperature level exceeding that which the surrounding structural material can accept. It is known to locate liners or thermal shields at the duct surface and to air cool such liners.

With aircraft engines in particular, light weight is important. Therefore, the liners are of thin material. Heat, therefore, cannot be readily conducted away from local hot spots longitudinally through the material and accordingly it is particularly important to uniformly cool the liner.

High temperatures in the liner with or without local hot spots will lead to an expansion problem causing a tendency to warp or buckle. This, in turn, can change the airflow passages thereby leading to aggravated coolant maldistribution.

Heat loads in various areas of the liner vary with respect to both the radiant and convective components. Even with a uniform gas temperature, the radiation will vary at different locations because of the variations in beam length. Convective heat loads vary particularly in transition sections such as where a square duct is changing to a round duct. It would be desirable to have the ability to adjust the cooling of the various duct areas in response to expected heat load variations.

SUMMARY OF THE INVENTION

A plurality of liner plates partially overlap one another in shingle fashion. A support frame has a support surface which is brazed to the upstream end of each liner plate. The exposed portion of the liner plate has a longitudinally extending depression which is deeper than the thickness of the plate. This permits transverse expansion of the plate to be accepted by the vertical components of the depression thereby avoiding buckling. Longitudinally, the liner plate is free to grow.

Each of these depressions narrows in the direction of gas flow with cooling air being introduced at the upstream end. The progressive narrowing of the depression provides highly effective levels of film cooling by minimizing the flow blockage at the end of each liner plate and by channeling film coolant into the blockage region.

The portions of the plate which do not contain these depressions have airflow also passing underneath them and are accordingly well cooled.

The inlet supply chambers to various sections of the liner plate assemblies are segmented with separate airflow supplies to each section, whereby cooling airflow may be adjusted in accordance with the predicted heat loading of the particular area.

The cooling airflow enters underneath the liner plate immediately downstream of the brazed connection continuing underneath this plate to cool it and is discharged at the end of the liner plate along the surface of the adjacent liner plate. This provides additional cooling of the gas side surface of the plate with it being particularly effective in the depressed area as described before.

Intermediate to the elongated depressions are shorter depressions at the downstream edge which overlap and are complementary with the upstream portion of an elongated depression from a downstream shingle. The cooling airflow passes between the two shingles at this point as well to provide a uniform cooling film for the downstream shingle.

DESCRIPTION OF THE PREFERRED EMBODIMENT

Figures 1, 2:
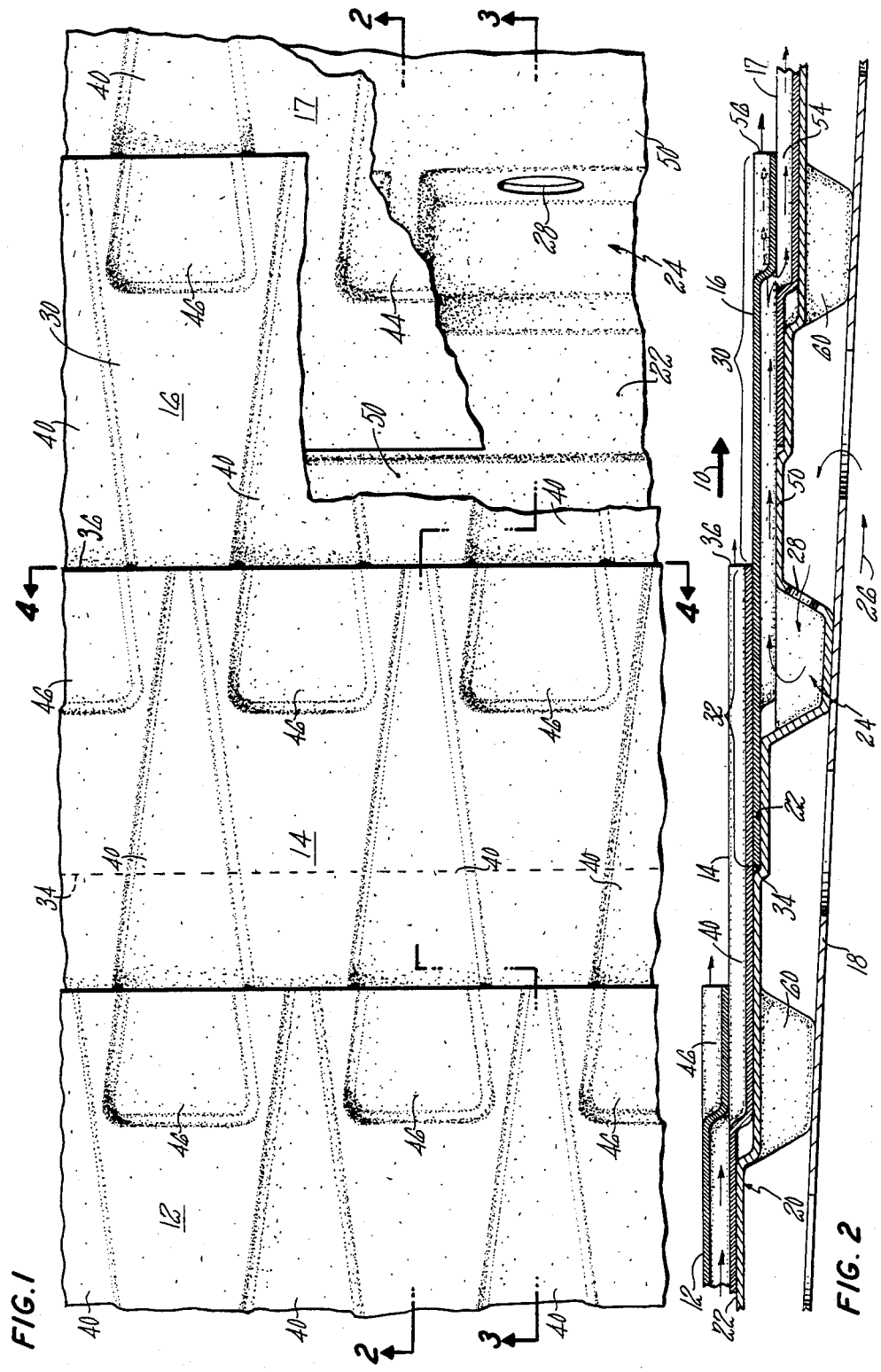
FIG. 1 is a planned view showing several overlapping liner plates.
FIG. 2 is a sectional view through section 22 of FIG. 1.

Referring initially to FIGS. 1 and 2 a hot gas flow 10 is passing through the duct from left to right as illustrated. Liner plates 12, 14 and 16 line the wall in overlapping fashion. Within outer structure 18 there is located a support frame 20 with support surfaces 22. The support frame has the support surfaces extending transversely to the gas flow and is undulating in the other direction forming an inlet cooling air plenum 24 supplied with cooling air 26 through a restricting flow orifice 28.

Liner plate 14 is brazed to support surface 22 at the upstream end with respect to gas flow 10. It overlaps the adjacent downstream liner plate 16 which is brazed to the support surface at its upstream end. Accordingly, each plate has an exposed surface such as the surface 30 of plate 16 extending from the downstream end of plate 14 to the end of plate 16. Each plate also has a shielded portion such as shielded portion 32 of plate 16 extending from its upstream end 34 which is brazed to support surface 22 to the downstream end 36 of plate 14. Each plate has elongated depressions 40 throughout the entire length of the exposed surface. These depressions are deeper than the thickness of the liner plate so that sides 42 of the depression provide flexing means to absorb transverse expansion of the liner plate.

Upstream extensions of these elongated depressions form shielded depressions 44 underlying the upstream plate.

Each upstream plate has a downstream depression 46 overlaying and complementary with the shielded depression. These downstream depressions are located intermediate to the elongated depressions 40 of plate 14.

Figure 3:
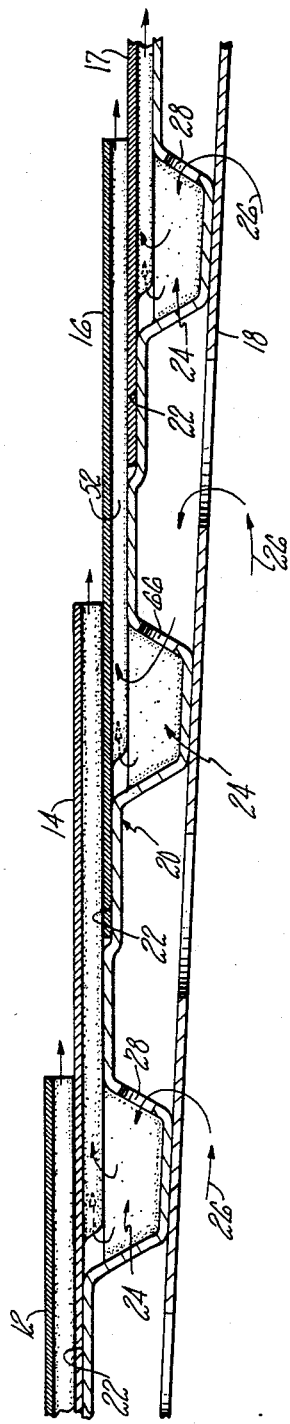
FIG. 3 is a sectional view through section 33 of FIG. 1.
Figure 4:
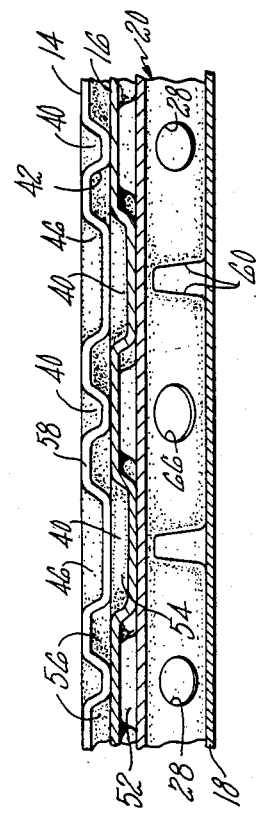
FIG. 4 is a transverse sectional view through section 44 of FIG. 1.
Figure 5:
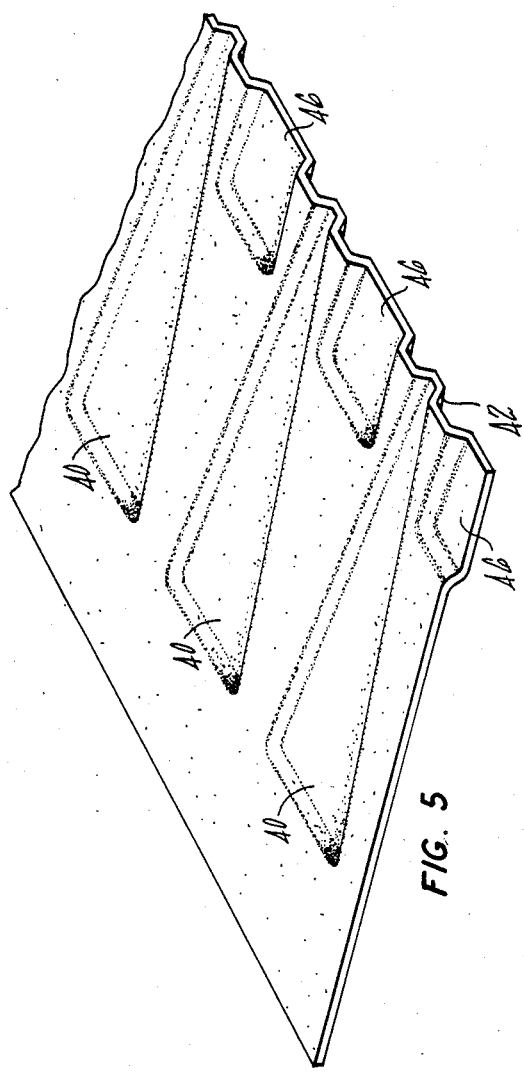
FIG. 5 is an isometric view of a single liner plate.
Figure 6:
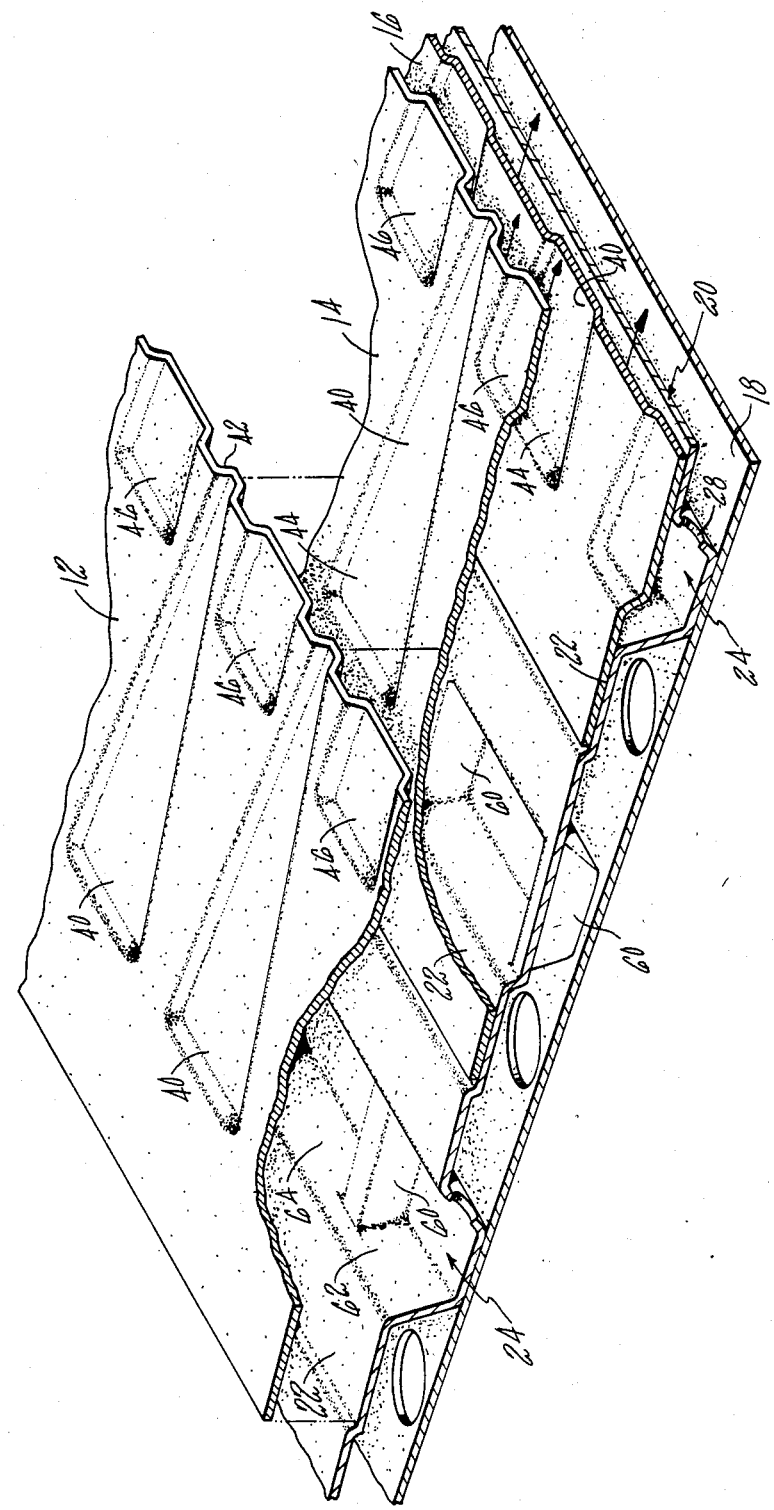
FIG. 6 is a isometric view of several overlapping liner plates.

FIGS. 2 and 3 best demonstrate the airflow cooling path around the liner plates. Cooling airflow 26 entering through orifice 28 passes into the inlet plenum 24. This is located immediately downstream of the support surface 22 where liner plate 16 is secured. The coolant passes underneath plate 16 between the plate and portion 50 of the support frame. The elongated depressions 40 are in contact with surface 50 and accordingly no cooling air passes below these portions of the liner. The coolant, however, passes through space 52 between the liner and the support frame cooling the bottom of the remainder of the liner plate. At the downstream end of liner plate 16 where it overlies plate 17 downstream depression 46 deflects the cooling flow downwardly into the shielded depression 44 of liner plate 17.

This provides a cooling flow path 54 discharging cooling air from under plate 16 to the upper surface of plate 17 in the area of the elongated depression. It can be seen that the elongated depressions 40 narrow in the direction of gas flow so that the airflow discharging to the hot surface thereof tends to be progressively restricted in flow thereby promoting an acceleration and cooling enhancement in this area. This is important because there is limited underplate cooling in this depressed area.

The downstream depression 46 may be of lesser depth than the elongated depression 44 if desired to increase size of flow path 54 and therefore the cooling flow quantity at this location.

Throughout the remainder of the plate cooling air passes through area 56 between the outermost portion 58 of plate 16 and the shielded portion 30 of plate 17. All of the cooling air passing under the liner passes out parallel to the downstream liner thereby producing a film cooling effect on that liner.

Support structure 20 has a plurality of baffles 60 extending substantially parallel to the gas flow which function to divide plenum 24 into separate plenums 62, 64. Accordingly, by varying the size of orifices 28, 66, etc., the amount of cooling air to the various sections of the liner plate may be varied to match the expected or test derived heat loadings of various portions of the liner. This is particularly important when the liner is used in a transition section where gas flow is not parallel to the walls of the duct but tends to have extensive crossflow therein.

We claim:

1. A liner for a hot gas duct having a hot gas flow therein:
    a support frame;
    a support surface forming a portion of said support frame and extending transverse to the gas flow;
    a plurality of liner plates, each liner plate secured at the upstream end to said support surface;
    supply means for supplying cooling air under each liner plate immediately downstream of said support surface;
    each liner plate located to partially overlap a downstream adjacent liner plate on the gas side, whereby each liner plate has an exposed portion and a shielded portion; and
    elongated depressions deeper than the thickness of said liner plate extending through the entire exposed portion of each liner plate.

2. A liner as in claim 1:
    shielded depressions in each plate comprising upstream extensions of said elongated depressions partially through the shielded portion of each liner plate.

3. A liner as in claim 2:
    downstream depressions in the downstream part of each exposed portion overlaying and complementary with said shielded depressions of the downstream adjacent liner plate, and
    said downstream depression and shielded depression in spaced relationship.

4. A liner as in claim 3:
    said elongated depressions narrowing in the direction of gas flow.

5. A liner as in claim 4:
    said elongated depressions in contact with the shielded portion of the downstream adjacent liner plate.

6. A liner as in claim 4:
    said downstream depressions located transversely with respect to gas flow between said elongated depressions.

7. A liner as in claim 1:
    a plurality of plenums each bounded by said support structure and a liner plate;
    said support plate in contact with said elongated depression of an overlying liner plate, but spaced from portions of said liner plate between said elongated depressions, whereby a cooling flow path is established under said liner plate.

8. A liner as in claim 7:
    a plurality of separate plenums located transverse to said gas flow;
    a restricted cooling air inlet to each of said separate plenums, whereby different amounts of cooling air may be supplied to each separate plenum.

* * * * *